H. Stafford,
Cage Trap.
N°. 10,758.   Patented Apr. 11, 1854.
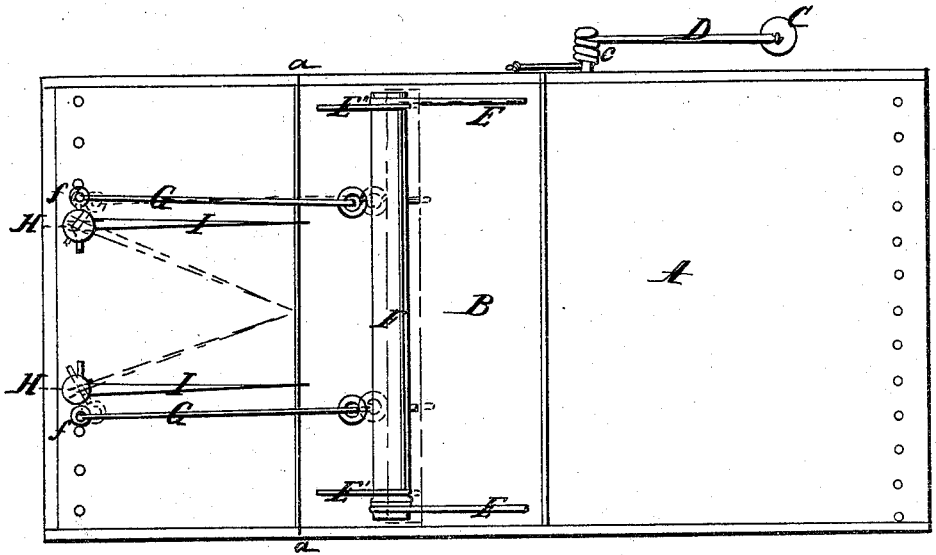
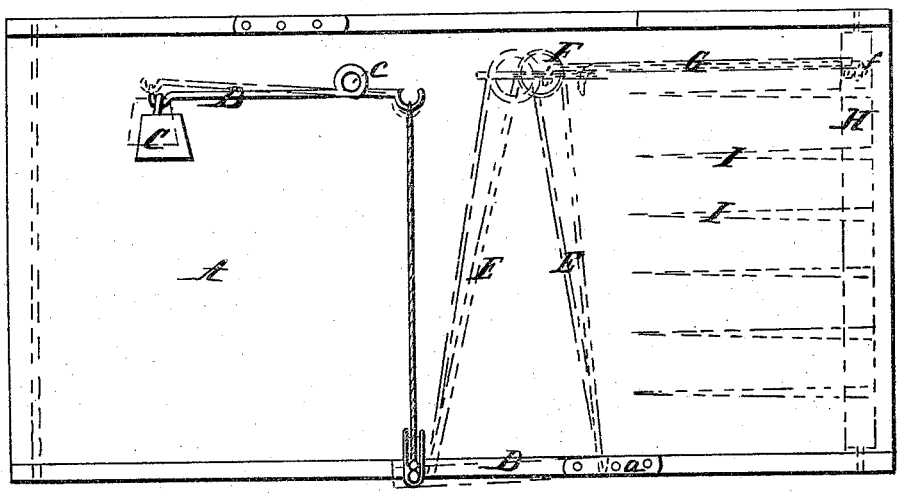

UNITED STATES PATENT OFFICE.

HIRAM STAFFORD, OF MOUNT PULASKI, ILLINOIS.

RAT-TRAP.

Specification of Letters Patent No. 10,758, dated April 11, 1854.

*To all whom it may concern:*

Be it known that I, HIRAM STAFFORD, of the city of Mount Pulaski and county of Logan and State of Illinois, have invented certain new and useful Improvements in Rat-Traps; and I do hereby declare that the following is a full, clear, and exact description thereof, reference being had to the accompanying drawings and to the letters of reference marked thereon.

The nature of my invention consists in constructing a rat-trap which is provided with a tilting-board which acts in combination with swinging arms or bars which constitute the barrier to prevent his escape and which are acted upon by the animal as he rests his foot on the tilting-board and causes them to be swung around until they intersect at their points and thereby prevent his escape in the most effectual manner.

To enable others skilled in the art to make and use my invention I will proceed to describe its construction and operation.

I construct a box A of a suitable form and in the bottom is placed a tilting board B, one edge of which is fixed to the bottom of the box by means of hinges $a$ and the other edge is sustained by a weight C on the end of the lever D the fulcrum of which is at $e$. On the tilting board are placed two sets of braces E E' which are connected together at the top by means of a bar F which is connected by means of rods G, G, to the periphery of the upright posts H, H, on which suitable bars or racks are formed.

The operation of my trap is as follows: The animal enters between the bars which are standing in the position seen at I, Fig. 1, and steps upon the tilting board which immediately sinks beneath his weight and carries the braces E E' and the bar F to the position seen is red lines which also draws on the rods G, G, which are attached to the periphery of the vertical posts H, H, at $f$ and causes them to be turned partially around so as to bring the forks or bars I, I, into the position seen in red lines. It will be seen in the drawings that it is impossible for the animal to escape after he has placed his foot upon the tilting board as the pointed bars invariably interrupt his progress. When it has left the tilting board the weight C immediately acts upon the apparatus and causes the bars to be thrown back to their original position for the purpose of admitting others who may desire to enter.

The advantage of this trap is the extraordinary cheapness with which they may be manufactured together with the efficacy, durability, and simplicity of their construction.

What I claim as my invention and desire to secure by Letters Patent is—

The combination of the tilting board with the swinging forks and their apparatus precisely as shown in the drawings and for the purpose and in the manner substantially as herein set forth and described.

HIRAM STAFFORD. [L. S.]

Witnesses:
R. B. LATHAM,
WM. H. RIDDLES.